March 16, 1943.　　F. O. HESS ET AL　　2,314,089
AIRCRAFT HEATER
Filed Nov. 15, 1940　　2 Sheets-Sheet 1
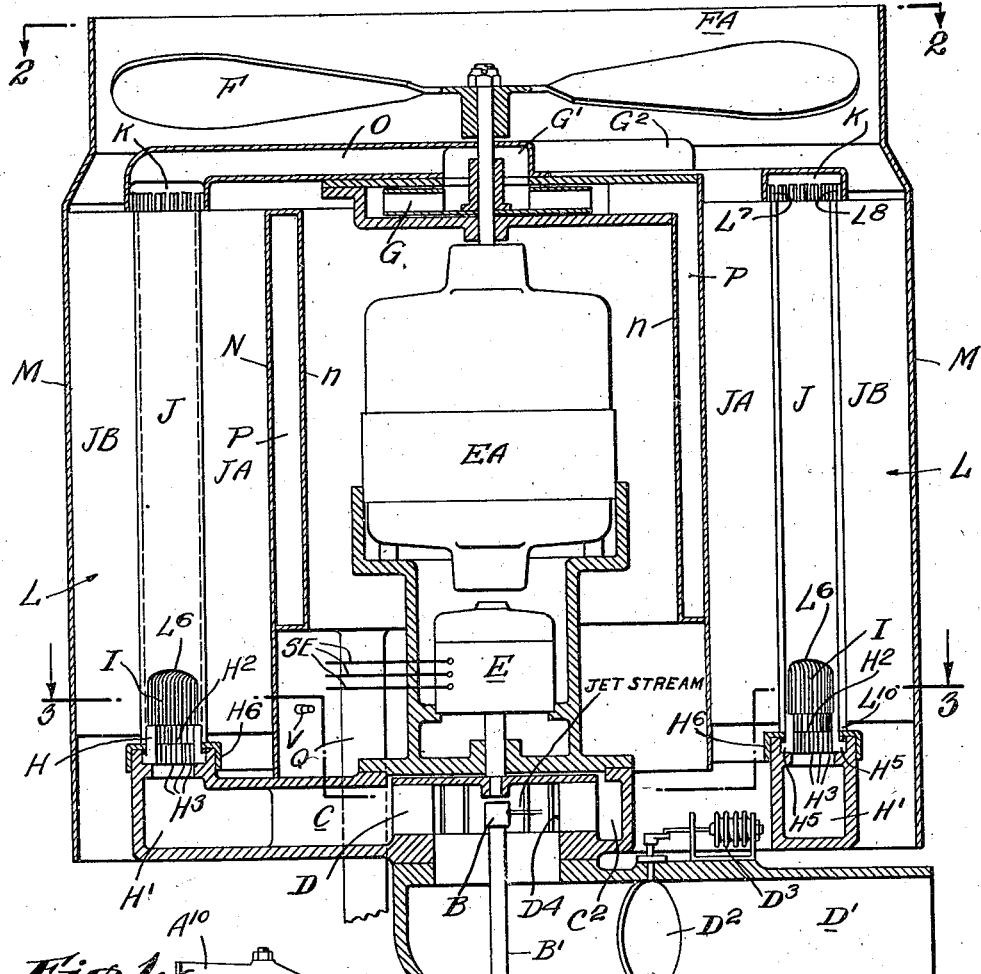
Fig. 1.
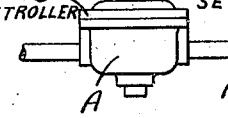
Fig. 2.
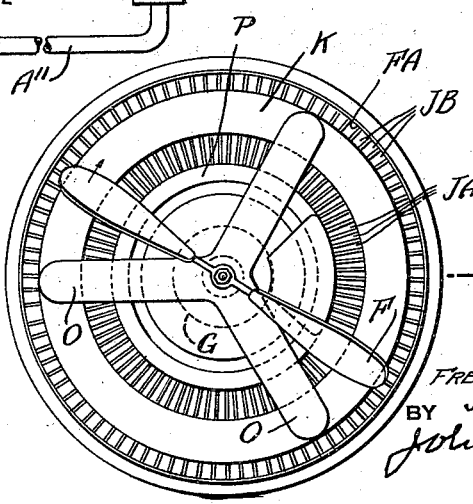
INVENTORS
FREDERIC O. HESS
JOHN W. TOWNSEND
BY John E. Hubbell
ATTORNEY March 16, 1943. F. O. HESS ET AL 2,314,089
AIRCRAFT HEATER
Filed Nov. 15, 1940 2 Sheets-Sheet 2

INVENTORS
FREDERIC O. HESS
JOHN W. TOWNSEND
BY
John E. Hubbell
ATTORNEY

Patented Mar. 16, 1943

2,314,089

UNITED STATES PATENT OFFICE 2,314,089

AIRCRAFT HEATER

Frederic O. Hess, Germantown, and John W. Townsend, Philadelphia, Pa., assignors to The Selas Company, Philadelphia, Pa., a corporation of Pennsylvania Application November 15, 1940, Serial No. 365,804

2 Claims. (Cl. 126—110)

The general object of the present invention is to provide a heater adapted for use in aeroplanes, and particularly for use in heating the cabin of a transport aeroplane, and in heating a war plane space occupied by a pilot, observer or gunner.

A more specific object of the invention is to provide a simple, light weight heater structure, adapted to burn any ordinary aeroplane engine fuel, and in particular to burn gasoline which has been lead treated to increase its octane content, and from which lead tends to separate when the gasoline is vaporized. Another specific object of the invention is to provide a heater characterized by the simplicity and effectiveness of its operation, and by the ease with which its heating effect may be manually controlled.

Our improved heater comprises means for forming a combustible mixture of air with gasoline passed through a mechanical atomizing device which delivers the gasoline while in the liquid phase, but in mist or spray form into a mixing space to which combustion air is also supplied.

In the preferred form of the present invention, we atomize the gasoline by spraying it into engagement with the rotary impeller of a turbo-blower employed to pass combustion air to the mixing space. In some cases, the said rotary impeller may be operated by a motor which also operates a ventilating fan for moving air to be heated through and over the heater. In other cases, however, we advantageously employ a small special motor to rotate the impeller at a speed higher than the practically desirable operating speed of a ventilator fan. The use of the special motor also permits of its speed variation in direct correspondence with the need for combustion air. By maintaining the gasoline in the liquid phase until it reaches the mixing space, we avoid the separation from the gasoline of lead, and the clogging of the burner orifices by lead, which would occur if the gasoline in the combustible mixture were vaporized prior to the formation of the mixture, unless means for filtering the separated lead out of the vaporized gasoline are provided. The inclusion of filtering provisions complicates the apparatus.

The invention is further characterized by the fact that the regulation of the heating effect produced by the apparatus may be effected by varying the pressure at which gasoline is passed to the heater. For example, the gasoline may be supplied to the atomizing device through a pressure regulator, which may be a simple form of pressure reducing valve, adjustable to deliver the gasoline to the atomizing device at a pressure varying through a moderate range, for example, from five pounds down to one pound.

In a preferred form of invention, the rate at which combustible air is supplied to the gasoline and air mixing space is controlled by varying the speed of the air moving impeller, as the pressure at which the gasoline supplied by the atomizing device is varied, and the amount of combustion air supplied to said space is subject to further regulation in automatic response to variations in the pressure of the atmosphere which thus compensates for the effect of aeroplane altitude variations.

In a preferred form of the invention, especially advantageous for use in war planes, a simple, manually adjustable control element is employed to increase and decrease the fan motor speed while simultaneously increasing or decreasing the pressure at which oil is supplied to the atomizing device.

Heretofore, aeroplane heating provisions have customarily been of a type to utilize aeroplane engine waste heat. The use of such aeroplane heating provisions under some present day operating conditions, gives rise to a number of practical disadvantages which may be avoided by the use of the present invention.

The various features of novelty which characterize our invention are pointed out with particularity in the claims annexed to and forming a part of this specification. For a better understanding of the invention, however, its advantages, and specific objects attained with its use, reference should be had to the accompanying drawings and descriptive matter in which we have illustrated and described a preferred embodiment of the invention.

Of the drawings:

Fig. 1 is an elevation in section on the line 1—1 of Fig. 2;

Fig. 2 is a plan view of the heater;

Figure 3:
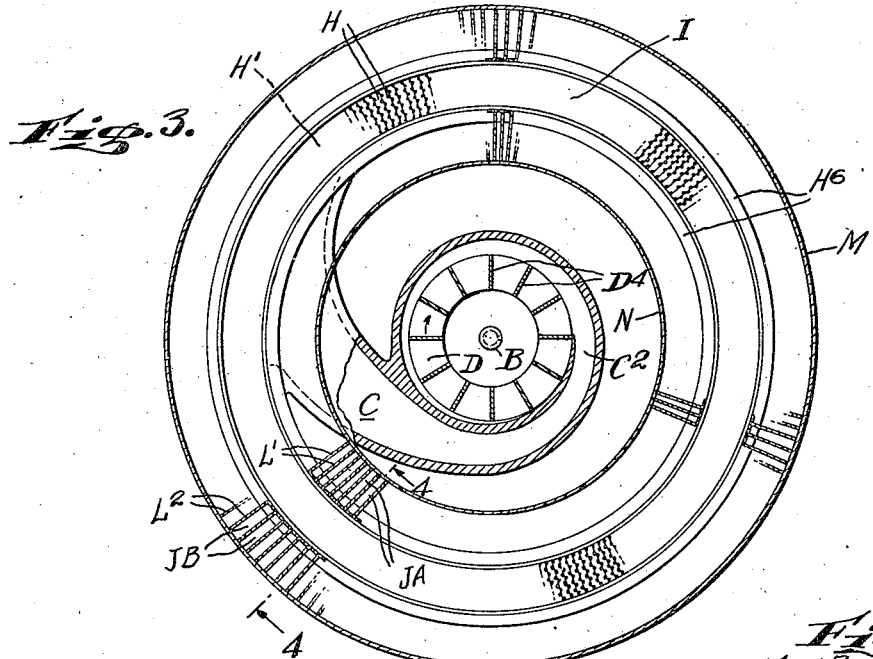
Fig. 3 is a section taken on the line 3—3 of Fig. 1.
Figure 4:
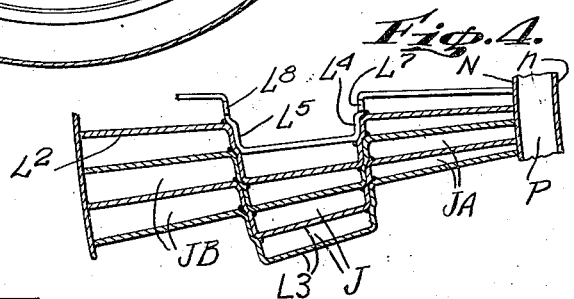
Fig. 4 is a partial section on the line 4—4 of Fig. 3.

In the heater arrangement shown, liquid fuel, which ordinarily is aeroplane engine gasoline, is supplied at a regulated pressure, from a source of oil under pressure, through a pressure regulator A and nozzle orifice B to a mixing passage, or space C, to which combustion air is also supplied by a blower D of the turbo-type. The blower D receives atmospheric air through an inlet pipe D', which as shown, is automatically throttled by means of a damper $D^2$ automatically adjusted by a bellows $D^3$, or analogous device to compensate for variations in atmospheric pressure, which may be great because of variations in the altitude of the aeroplane in which the heater is used.

In the preferred arrangement shown, the blower D also forms a means for mechanically atomizing the gasoline supplied through the orifice B, and mixes the atomized gasoline with the combustion air delivered to the mixing space C. As shown, the orifice B is formed in the side wall of the gasoline supply pipe B' which is so disposed that the jet of gasoline discharged through the orifice B, is directed away from the axis of the blower D into the surrounding annular impeller space through which the impeller blades $D^4$ of the blower D are rotated.

As shown in Fig. 1, the impeller of the blower D is rotated by a small electric motor E, which is located beneath, and coaxial with a larger motor EA, employed to rotate a ventilator fan F, which moves the air heated through the heater. As shown in Fig. 1, the motor EA also operates an exhaust fan G employed to create a draft suction utilized in moving products of combustion through and away from the heater.

The combustible mixture of air and fuel formed in the space C, is discharged into the annular fuel chamber H' of a burner H which is coaxial with the motor E, and comprises a burner or orifice wall $H^2$, having orifices $H^3$ through which combustible jets of a fuel and air mixture are discharged into an annular combustion space I. In the preferred construction shown, said burner H is of the type disclosed in the prior applications of Frederic O. Hess, one of the applicants herein, Serial No. 320,189, filed February 2, 1940, now Patent No. 2,228,114, and Serial No. 713,433, filed March 1, 1934, and has a burner orifice wall $H^2$ formed by side by side, radially extending plate-like bodies of ceramic material, with orifice grooves $H^3$ in their sides. As shown, each ceramic plate is formed adjacent each end with an uprising projection, and the said projections of the different plates unite to form the sides of a trough shaped ignition space into which the orifices $H^3$ open.

Each of the ceramic plates is also formed with a shoulder extension $H^5$ at each end, which is overlapped by a flange portion of a corresponding annular retaining member $H^6$. The latter is of angle bar cross section and is suitably secured to the body of the burner H.

In the preferred construction shown, the air and fuel mixing space C is in the form of a spiral, expanding nozzle, having a wall which may be cast integrally with the body of the burner H, and which delivers the combustible mixture formed in the space C to the burner chamber H' at a suitably moderate velocity. The air inlet C' to the passage C, is at the outlet end of the channel $C^2$ which extends about the axis of blower D for more than 360°, and increases in cross section along the length of the portion thereof directly receiving air from said blower.

Products of combustion move away from the combustion space I through a heat exchanger, which in the preferred construction illustrated, is a channeled structure comprising products channels J, and air channels JA and JB. The products channels J, are parallel to, and arranged in a circular series about the axis of the motor E, and open at their ends remote from the burner into a coaxial annular channel K. The air channels JA are arranged in a circular series at the inner side, and the air channels JB are arranged in a circular series at the outer side of the series of channels J. In the construction shown, the various channels are separated from one another by sheet metal wall members L, each channel J, a corresponding channel JA, and a corresponding channel JB, being between two similar walls L, and each such wall separating a channel J, a channel JA and a channel JB at one side of the wall, from a channel J, a channel JA and a channel JB at the other side of the wall.

Figure 5:
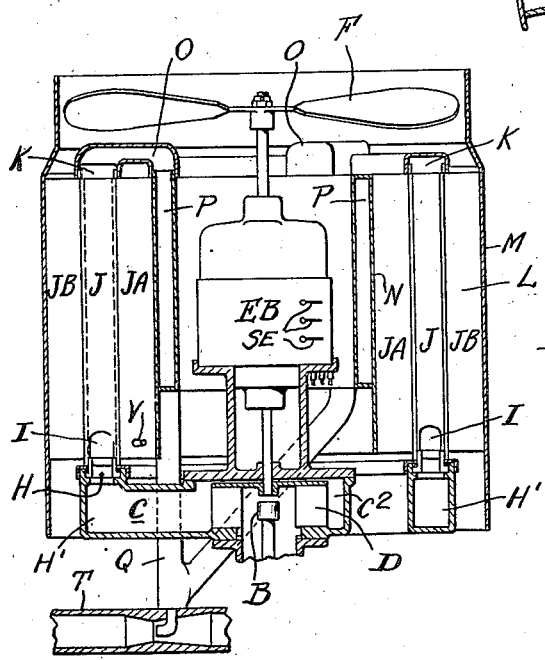
Fig. 5 is a partial section taken similarly to Fig. 1 illustrating a modification.

As shown, each of the walls L is formed from a flat blank of sheet metal rectangular in outline, which is bent or stamped to form a longitudinally extending trough shaped depression, so that the bent or stamped wall comprises inner and outer portions L' and $L^2$ lying in the same plane, a trough bottom portion $L^3$ in a plane parallel to, but laterally displaced from, the first mentioned plane, and transverse portions $L^4$ and $L^5$, which form side walls of the trough. In the assembled structure as shown in Fig. 5, the trough portions of the adjacent walls L are nested together. The portions L', $L^3$ and $L^4$ of each wall L form the side walls of corresponding channels JA, J, and JB respectively. The portions $L^4$ separate the adjacent edges of the channels JA and J, and the wall portion $L^5$ separates the adjacent edge portions of the channels J and JB.

The wall blank is formed with a notch $L^6$ at one end, the edge of which extends about and defines the combustion chamber I. The side walls of the latter are formed by the blank portions $L^4$ and $L^5$, the notch $L^6$ being formed, in effect, by cutting away some of the central blank portion $L^3$. At the end of the wall blank remote from the burner, are integral extensions $L^7$ and $L^8$ of the blank portions $L^4$ and $L^5$. In the assembled structure, the various blank projections $L^7$ extend along the inner side wall of the channel K, and the projections $L^8$ similarly extend along the outer wall of the channel K. In the assembled channeled structure, the overlapping portions $L^4$ and $L^5$ may be welded or brazed together at the combustion chamber ends of the structure. As shown, the wall blank is formed at its burner end with projections, which are similar to, and welded and brazed together as are the projections $L^7$ and $L^8$. If considered necessary, the overlapping portions $L^4$ and $L^5$ may be welded or brazed together along their entire lengths, but it is expected that in heaters of moderate or small size, it will ordinarily be unnecessary to weld or braze the wall parts L together except at the ends of the channeled structure, particularly if the air pressure in the channels JA and JB is higher than the heating gas pressure in the channels J, so that products of combustion will not leak into admixture with the air being heated.

As shown, the outer edges of the channels JB are closed by a cylindrical sheet metal wall M, which constitutes the shell or outer wall of the heater body and the inner edges of the channels JA are closed by a cylindrical sheet metal wall N. As shown, the ends of the air channels JA and JB adjacent the burner are open to the cabin or other space in which the heater is located, and the ends of the channels remote from the burner, open to said space through a fan chamber FA which is surrounded by an end portion of the wall M, of somewhat smaller diameter than the body portion of the wall M. The fan F works in the chamber FA, and draws air from the cabin or other space to be heated, and in which the heater is located, through the channels JA and JB, and discharges the air heated into said space. As will be apparent, some of the air heated and circulated, does not pass through the channels JA and JB, but is drawn through the annular space between the motors E and EA and the surrounding structure.

As shown, the fan chamber of exhaust fan G is located between the motor E and the ventilation fan F, and receives products of combustion from the annular channel K through one or more radial conduits O. The outlet $G^2$ of the fan G delivers products of combustion to exhaust piping Q. In the construction shown, the outlet $G^2$ is connected to the pipe Q through an annular space P surrounding the motor E and having its outer wall formed by the wall N, and its inner wall formed by a concentric cylindrical wall $n$.

By associating a suitable hood or hoods with the discharge end of the exhaust piping Q, a draft suction may be created when the aeroplane is in flight, which may supplement that created by the fan G, and in some cases may well be high enough to make the use of the exhaust fan G unnecessary.

The previously mentioned pressure regulator A, is located at the outer side of the heater shell M, and is, in effect, an automatic pressure reducing valve, including means through which an angular adjustment of the regulator handle $A^{10}$ varies the pressure at which the regulator delivers the fuel liquid through its outlet $A^{11}$, to the pipe B' and orifice B. The regulator A may take any one of the various known forms comprising differential valve operating means subjected to a suitable valve opening force, and to an opposing valve closing force which is formed in part by the pressure at which the liquid is discharged from the regulator. The adjustment handle $A^{10}$ varies one of said opposing forces, usually by varying the compression of a spring, and thereby varies the liquid discharge pressure required to maintain the valve opening and closing forces in balance.

The amount of air supplied to the burner should be suitably proportioned to the amount of fuel supplied by the regulator, and in a preferred form of the regulator, the handle $A^{10}$ when adjusted to vary the fuel pressure, also varies the speed of the motor E, by adjusting suitable motor control means S, which may be mounted in the regulator A and is connected through conductors SE which are included in the motor energizing circuit provisions and may take any usual form. The motor control and air pressure regulator provisions are thus so cooperatively related, that the adjustment of a single simple control element, such as the handle $A^{10}$, will increase or decrease the speed of the motor E and simultaneously increase or decrease the pressure of the fuel supplied by the regulator A to the burner H.

In the modified construction illustrated in Fig. 5 the separate turbo-blower motor E and the circulating fan motor EA of Fig. 1, are replaced by a single motor EB, the impeller of the blower D being connected to the lower end of the shaft of the motor EB, while the fan F of Fig. 5 is connected to the upper end of that shaft. The single motor EB may be controlled as is the motor E of Fig. 1, by the same control element which regulates the fuel supply pressure. The use of the single motor EB simplifies the construction somewhat, and tends to increase and decrease the amount of air moved through and heated by the heater as the fuel supplied to the heater is increased and decreased, and correspondingly increases and decreases the amount of heat available for use in heating the air. Furthermore, when there is need for an increased cabin heating effect, the more active circulation of the cabin atmosphere effected when the speed of the single motor EB is increased, may desirably reduce local variations in the cabin temperature.

In general, however, we prefer to use combustion air and heating air fan motors which are separate from one another and independently regulable, as are the motors E and EA shown in Fig. 1. In some cases, it is practically essential that the combustion air and heating air moving effects should be separately regulable. In general, also, the use of a separate driving motor for the blower D, employed to move combustion air through the burner and to atomize the gasoline, is desirable, because the speed of such a blower may advantageously be substantially higher than the speed of the air circulating fan F.

As previously indicated, an exhaust fan G is unnecessary in some cases, and no such fan is included in the arrangement shown in Fig. 5, wherein the conduits O directly connect the annular combustion products manifold space K to the heat exchanger space P. In the arrangement shown in Fig. 5, the outlet piping P has its discharge end connected to a hood T, which may be suitably disposed in the aeroplane, so that the aeroplane movement will create an aspirating effect in the hood T, adequate to draw products of combustion out of the heater and discharge them into the external atmosphere when fuel is being burned in the heater at its maximum rate, as normally will occur only when the aeroplane is moving through the air at a high altitude.

Regardless of whether the heater includes one or two motors, the fact that the heater control is manually effected, and is simple in character, is generally advantageous, and is of especial advantage when the heater is employed to heat the turret or gun space of a war plane in which the temperature needed for the bodily comfort and welfare of the gunner may vary widely with the conditions under which he is working.

With either form of the invention illustrated, the gasoline is effectively atomized, and is mixed while still wholly, or mainly in the liquid phase with the combustion air supplied to the mixing space C. In consequence, the burner chamber H' is supplied with a combustible mixture adapted to burn freely and effectively in the combustion space I. With the gasoline content of the combustible mixture, wholly or mainly in the liquid phase, there is little or none of the lead settling out action which inevitably occurs when combustion air is mixed with fully vaporized aviation gasoline which has been lead treated to increase its octane content. The amount of lead then settling out of the gasoline vapors, is sufficient to require that the vapors be filtered to prevent the lead from clogging burner orifices or other fine passages through which the filtered vapors are passed. The unnecessary inclusion of filtering provisions in a heater intended for the uses of the heater disclosed, is highly objectionable. The lead content of the gasoline carried into the combustion chamber of our heater, is converted into fume which passes out of the heater with the waste heating gases without significant interference with the heater operation.

In addition to its advantageous capacity for operation with the almost universally available aeroplane motor fuel, our improved heater has other practically important advantages for its intended use. The use of mechanical atomizing provisions ensures effective atomization of the gasoline supplied to the atomizing means at low pressure, and we now contemplate that the pressure at which gasoline is supplied to the nozzle B between a maximum of five pounds and a minimum of one pound. The use of fuel oil at a supply pressure of only five pounds or so, has the advantage that the supply pressure may be easily maintained by a hand pump if necessary under emergency conditions. With such a moderate supply pressure, we have found that a suitable rate of fuel supply to the burner can be maintained at all times, notwithstanding the wide variations in atmospheric temperatures and pressures experienced in the operation of an aeroplane at the now customary altitudes ranging up to and above 25,000 feet. The automatic control of the damper $D^2$ by the atmospheric pressure responsive device $D^3$, insures the supply of a suitable volume of combustion air to the fuel mixing space C regardless of the variations in atmospheric pressure.

Our improved heater will ordinarily be provided with suitable ignition means such, for example, as an electrical igniter V extending into the combustion chamber from the inner side of the wall member N as shown in Fig. 1. The igniter V may be provided at its inner end with sparking electrodes, or with a so-called "hot-wire."

The aircraft heater comprises improvement over an aircraft heater previously invented by Frederic O. Hess, one of the applicants herein, and disclosed in his application for patent Serial No. 348,324, filed July 29, 1940, and claims on novel combinations disclosed alike in said application and herein, and not herein claimed, are made in applications for patent Serial No. 409,439 and Serial No. 409,440, each filed on September 4, 1941, by the said Frederic O. Hess, and each of which is a continuation in part of said application Serial No. 348,324. Our improved heater possesses the general advantages of low construction cost, efficiency of operation, and relatively great heating capacity per unit of heater weight, and volume of space occupied, which characteristic the heater disclosed in said prior application. By our use of mechanical atomizing provisions, in lieu of the atomizing provisions of different character disclosed in said prior application, we have improved and simplified the heating apparatus and its operation, and have made possible a material and desirable reduction in the gasoline supply pressure required.

While in accordance with the provisions of the statutes, we have illustrated and described the best forms of embodiment of our invention now known to us, it will be apparent to those skilled in the art that changes may be made in the form of the apparatuses disclosed without departing from the spirit of our invention as set forth in the appended claims, and that in some cases, certain features of our invention may be used to advantage without a corresponding use of other features.

Having now described our invention, what we claim as new and desire to secure by Letters Patent is:

1. A compact, light weight airplane heater comprising an air heating space, a combustion chamber, a thin metal wall structure separating said combustion chamber from said air heating space, means for passing air from the enveloping atmosphere into said combustion chamber comprising a fan of the turbo blower type having a rotary impeller with blades extending outwardly from the periphery of a central inlet space, a motor adapted to rotate said impeller at relatively high speeds, means for atomizing gasoline and mixing it with the air passing to the combustion chamber comprising a nozzle receiving the gasoline under pressure and discharging it in the form of a jet stream flowing toward the path of rotation of said impeller against which the gasoline impinges in a substantially unatomized condition.

2. An airplane heater as specified in claim 1, comprising a throttling valve adjustable to vary the rate at which gasoline is supplied to said nozzle means, motor energizing means adjustable to vary the speed of the fan driving motor and an adjustable control element adapted by its adjustment to simultaneously adjust said motor energizing means and valve and thereby increase and decrease the motor speed as the rate at which gasoline is supplied to said nozzle means is increased and decreased.

FREDERIC O. HESS.
JOHN W. TOWNSEND.